United States Patent [19]

Tazi et al.

[11] Patent Number: 5,034,488
[45] Date of Patent: * Jul. 23, 1991

[54] SLURRY POLYMERIZATION OF CROSSLINKED MALEIC ANHYDRIDE-ALKYL VINYL ETHER COPOLYMERS IN A SOLVENT SYSTEM COMPRISING A CARBOXYLIC ACID ESTER AND A SATURATED HYDROCARBON

[75] Inventors: Mohammed Tazi, Wayne, N.J.; Yoon T. Kwak, Brooklyn, N.Y.; Robert B. Login, Oakland, N.J.

[73] Assignee: GAF Chemicals Corporation, Wayne, N.J.

[*] Notice: The portion of the term of this patent subsequent to Apr. 16, 2008 has been disclaimed.

[21] Appl. No.: 463,709

[22] Filed: Jan. 11, 1990

[51] Int. Cl.$^5$ ............................................. C08F 34/02
[52] U.S. Cl. ..................................................... 526/271
[58] Field of Search .......................................... 526/271

[56] References Cited

FOREIGN PATENT DOCUMENTS 3233775 11/1982 Fed. Rep. of Germany ...... 526/271
328725 2/1988 United Kingdom ................ 526/271

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

A polymerization process is described herein for making crosslinked copolymers of maleic anhydride and an alkyl vinyl ether characterized in that polymerization is carried out in a solvent system which is a mixture of a carboxylic acid ester and a saturated hydrocarbon, preferably a mixture of ethyl acetate and cyclohexane in the weight ratio of about 35% to 55% ethyl acetate and 45% to 65% cyclohexane.

6 Claims, No Drawings

SLURRY POLYMERIZATION OF CROSSLINKED MALEIC ANHYDRIDE-ALKYL VINYL ETHER COPOLYMERS IN A SOLVENT SYSTEM COMPRISING A CARBOXYLIC ACID ESTER AND A SATURATED HYDROCARBON

BACKGROUND OF THE INVENTION

1. Field of the Invention

This invention relates to crosslinked copolymers of an alkyl vinyl ether and maleic anhydride and to a method for their preparation.

2. Description of the Prior Art

Copolymers of lower alkyl vinyl ethers and maleic anhydride have long been known as water-soluble thickening agents and the crosslinking of such linear copolymers by means of a difunctional or polyfunctional monomer has been practiced as a means of obtaining aqueous or alcoholic gelatinous compositions of very high viscosity which are particularly useful in the formulation of cosmetics. In some instances it is, moreover, advantageous to effect hydrolysis and neutralization of the anhydride groups of the crosslinked copolymer. A variety of such crosslinking agents is disclosed in the prior art which encompasses most classes of compounds containing a plurality of unsaturated groups, for example polyunsaturated hydrocarbons, diunsaturated esters, amides and ethers. See U.S. Pat. Nos. 3,448,088; 4,366,294; 4,387,186; British Patent No. 1,285,208 and EPO Patent No. 315,021.

The polymerization has been carried out conveniently by preparing a solvent solution of the monomers and adding a catalytic amount (generally from 0.001 to 1.0%) of an organic free radical-generating initiator. The resulting solution then is mixed thoroughly and heated sufficiently so that the polymerization reaction takes place. At the completion of the polymerization reaction, the precipitated interpolymer is isolated by any suitable means such as by filtration or distillation of solvent, then washed with fresh solvent and vacuum dried. Moreover, the polymerization has been conducted by adding a solution of the vinyl ether to a solution of initiator, maleic anhydride and solvent, or by adding a solution of divinyl ether to a solution of maleic anhydride, monovinyl ether, solvent and initiator.

Suitable solvents which have been used include benzene, toluene, xylene, acetone, methyl ethyl ketone, and methylene chloride. Even an excess of the alkyl vinyl ether employed also has been used as solvent since the polymer formed consists of equimolar alternating units of vinyl ether and maleic anhydride. Benzene or methyl vinyl ether were considered the most suitable from the standpoint of product isolation and obtaining crosslinked polymers having high molecular weights.

The organic free radical-generating initiators included azobisisobutyronitrile, benzoyl peroxide, lauroyl peroxide, caprylyl peroxide, acetyle peroxide, acetyl benzoyl peroxide, di-tert-butyl peroxide, azobis(2,4-dimethyl-valeronitrile) and the like. Mixtures of such catalysts were also suitable in the process of making the interpolymers of the invention.

The polymerization was carried out at a temperature within the range of 0° to 150° C., for the most part, in the range from 50° to 100° C., particularly about 60°-80° C.

The amount of crosslinking agent generally varied from about 1 to about 5 mole percent based on monovinyl alkyl ether. Examples of suitable crosslinking agents included the divinyl ethers of an aliphatic diol, e.g. the divinyl ethers of 1,2-ethanediol; 1,3-propanediol; 1,4-butanediol, 1,5-pentanediol; 1,6-hexanediol; 1,7-heptanediol; 1,8-octanediol; 1,9-nonanediol; 1,10-decanediol; 1,11-unidecanediol; and 1,12-dodecanediol, as well as the divinyl ethers of diethylene glycol, triethylene glycol, tetraethylene glycol, pentaethylene glycol; hexaethylene glycol, heptaethylene glycol, octaethylene glycol, nonaethylene glycol, decaethylene glycol and further polyalkylene glycols up to a molecular weight of about 5900. Other suitable crosslinking agents include 1,7-octadiene, 1,9-decadiene, divinylbenzene, N,N'-bis-methylene acrylamide, acrylates such as polyethylene glycol diacrylate, trimethylolpropane triacrylate, propylene glycol diacrylate, polyhydric alcohols esterified once or twice with acrylic acid triallylamine, tetraallylehylenediamine, diallyl phthalate, and the like. A disadvantage of many of the known crosslinked copolymers is, however, that they may give rise to gels which have poor clarity, low viscosity, insufficient stability, low salt tolerance, and poor slurry formation.

It is an object of the present invention, therefore, to provide a crosslinked copolymer based on a lower alkyl vinyl ether and maleic anhydride which can provide clear gels rapidly upon neutralization of suitably high viscosities, and enhanced stability as measured by their retention of viscosity during storage at 50° C., and excellent salt tolerance, favorable powder formation during polymerization, and which can be made in a high solids content.

These and other objects and features of the invention will be made apparent from the following more particular description of the invention.

SUMMARY OF THE INVENTION

A polymerization process is described herein for making a crosslinked copolymer of maleic anhydride and an alkyl vinyl ether monomers in which polymerization is carried out in a solvent system which is a mixture of a carboxylic acid alkyl ester and a saturated hydrocarbon, preferably a mixture of ethyl acetate and cyclohexane, in the weight ratio of about 35 to 55% ethyl acetate and 45 to 65% cyclohexane.

DETAILED DESCRIPTION OF THE INVENTION

In accordance with the invention, an improved process for the crosslinked polymerization of maleic anhydride and an alkyl vinyl ether is provided herein. The improvement is characterized by carrying out the polymerization in the presence of a cosolvent system which is a mixture of a carboxylic acid ester and a saturated hydrocarbon, such as ethyl acetate and cyclohexane, respectively, preferably in the weight ratio of about 35 to 55% ethyl acetate and 45 to 65% cyclohexane.

In this improved process, the crosslinked copolymer is provided as a fine white powder in pumpable slurry form in the solvent system, of high viscosities, good stability, and excellent salt tolerance, which can be readily hydrolyzed to clear gels. These properties make the crosslinked copolymer product of the invention particularly suitable for use in oral compositions and personal care formulations.

The preferred range of the cosolvent system of the invention provides a slurry containing fine powders which can be handled easily. Cosolvent mixtures outside the preferred range, however, tend to produce lumpy copolymers, which are more difficult to filter and dry.

While the description above has been directed to formation of crosslinked copolymers of maleic anhydride and alkyl vinyl ethers, it will be understood that the cosolvent system of the invention also may be used for making non-crosslinked copolymers simply by omitting the crosslinking agent in the polymerization reaction.

The invention will now be described with reference to the following examples.

EXAMPLE 1

A reactor was precharged with a 50:50 weight mixture of ethyl acetate (EA) and cyclohexane (CH) as a cosolvent composition, and 1,7-octadiene (OD) as a crosslinking agent. The reactor was then purged with nitrogen, heated to 58° C., and charged with initiator (Lupersol-11 which is t-butyl peroxypivalate) at a 0.15 to 2% by weight level based on maleic anhydride (MA). Then molten maleic anhydride and methyl vinyl ether (MVE) were fed separately (or through a common inlet) into the reactor over a 2 to 3 hr. period. The reactants were held at that temperature for an additional 1 to 3 hrs., then cooled, vented and discharged. The resulting slurry, in which the copolymer product was present at an 18 to 25% solids level, was filtered and dried.

EXAMPLE 2

The reactor was charged with a mixture of cyclohexane and ethyl acetate to which 1,7-octadience was added as a crosslinking agent. The reactor was then purged with nitrogen gas and heated to 58° C. The initiator (Lupersol-11 at 0.5 to 2%) was charged into the reactor. The MA solution in ethyl acetate was then fed over a period of 2-3 hrs. The system was held at that temperature for an additional 2-3 hrs., cooled, vented and discharged. The resulting slurry was filtered and dried.

EXAMPLE 3

The process of Example 1 was repeated using a reactor precharged with MA, a 50:50 weight ratio of EA/CH, a 2.5 to 10% (w/w) level of OD crosslinker. MVE was admitted with initiator (0.1-3% level). The resulting crosslinked copolymer was present in the slurry at a solids level of 15-40%.

EXAMPLE 4

The process of Example 1 was repeated using a precharge of MVE, CH/EA, and OD, to which molten MA and initiator was added. A similar result was obtained.

EXAMPLE 5

The crosslinked copolymer of Example 1 was hydrolyzed and neutralized rapidly at 80° C. to form a clear gel having a high viscosity, which was stable at room temperature for an extended period of time.

EXAMPLE 6

The process of Example 1 was repeated without the use of the crosslinking agent. A copolymer of uncrosslinked MA and MVE was obtained in such polymerization.

What is claimed is:

1. In a polymerization process for making a crosslinked or non-crosslinked copolymer of maleic anhydride and an alkyl vinyl ether, the improvement which comprises carrying out said polymerization in a cosolvent system which comprises about 45 to 65% by weight cyclohexane and about 35 to 55% weight ethyl acetate.

2. A process according to claim 1, wherein a crosslinked copolymer is obtained and said crosslinking agent is a diethylenic compound.

3. A process according to claim 2, wherein said crosslinking agent is selected from 1,7-octadiene, 1,9-decadiene, divinylbenzene, 1,4-butanediol divinyl ether, bismethylene acrylamide, 1,4-divinyloxybutane, a divinyl ether of an aliphatic diol, polyethylene glycol diacrylate, trimethylolpropane triacrylate, propylene glycol diacrylate and polyhydric alcohols esterified with acrylic acid.

4. A process according to claim 1, wherein the mole ratio of maleic anhydride and alkyl vinyl ether is about 1:1.05 to about 1:2, respectively.

5. A process according to claim 2, wherein the resulting crosslinked copolymer is obtained as a fine white powder in pumpable slurry form in the cosolvent system, and is characterized by being of high viscosity, good stability, and excellent salt tolerance.

6. A process according to claim 1, wherein said copolymer is not crosslinked.

* * * * *